(12) United States Patent
Iwane et al.

(10) Patent No.: US 11,929,485 B2
(45) Date of Patent: Mar. 12, 2024

(54) SECONDARY BATTERY

(71) Applicant: MURATA MANUFACTURING CO., LTD., Kyoto (JP)

(72) Inventors: Nobuyuki Iwane, Kyoto (JP); Hiroshi Horiuchi, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 550 days.

(21) Appl. No.: 17/178,857

(22) Filed: Feb. 18, 2021

(65) Prior Publication Data

US 2021/0175487 A1    Jun. 10, 2021

Related U.S. Application Data (63) Continuation of application No. PCT/JP2019/036788, filed on Sep. 19, 2019.

(30) Foreign Application Priority Data

Sep. 19, 2018   (JP) .................................. 2018-175042

(51) Int. Cl.
    *H01M 4/131*      (2010.01)
    *H01M 4/525*      (2010.01)
    *H01M 4/62*      (2006.01)
    *H01M 4/66*      (2006.01)
    *H01M 10/0525*      (2010.01)
    *H01M 4/02*      (2006.01)

(52) U.S. Cl.
CPC ........... *H01M 4/131* (2013.01); *H01M 4/525* (2013.01); *H01M 4/623* (2013.01); *H01M 4/661* (2013.01); *H01M 10/0525* (2013.01); *H01M 2004/028* (2013.01)

(58) Field of Classification Search
None
See application file for complete search history.

(56) References Cited

U.S. PATENT DOCUMENTS

| 2016/0156016 A1* | 6/2016 | Umeyama | H01M 4/661 |
| | | | 29/623.1 |
| 2017/0125795 A1* | 5/2017 | Sugiura | H01M 4/58 |
| 2017/0155143 A1* | 6/2017 | An | H01M 4/131 |

(Continued)

FOREIGN PATENT DOCUMENTS

| CN | 1949561 | 4/2007 |
| JP | 4021651 B2 | 12/2007 |
| JP | 4021652 B2 | 12/2007 |

(Continued)

OTHER PUBLICATIONS

Machine translation of JP2017117754 (Year: 2017).*

(Continued)

*Primary Examiner* — Wyatt P McConnell
(74) *Attorney, Agent, or Firm* — K&L Gates LLP (57) ABSTRACT

A secondary battery includes a positive electrode, a negative electrode, and an electrolyte. The positive electrode includes a positive electrode active material layer that includes a positive electrode active material, a fluorine-based binder having a melting point from 152° C. to 166° C., a conductive assistant having a specific surface area from 1000 m²/g to 1500 m²/g, and a vinylpyrrolidone-based polymer.

10 Claims, 3 Drawing Sheets

(56) References Cited

U.S. PATENT DOCUMENTS

2018/0108944 A1* 4/2018 Yamakaji .............. C07F 7/1804
2019/0288277 A1   9/2019 Michibata et al.

FOREIGN PATENT DOCUMENTS

| | | |
|---|---|---|
| JP | 4053763 B2 | 2/2008 |
| JP | 2011082083 A | 4/2011 |
| JP | 2012164624 A | 8/2012 |
| JP | 2017054649 A | 3/2017 |
| JP | 2017117754 A | 6/2017 |
| JP | 2017168435 A | 9/2017 |

OTHER PUBLICATIONS

International Search Report for Application No. PCT/JP2019/036788, dated Dec. 10, 2019.
Japanese Office Action dated Dec. 7, 2021 in corresponding Japanese Application No. 2020-548605.
Chinese Office Action dated Dec. 1, 2023 in corresponding Chinese Application No. 201980054216.7.

* cited by examiner

SECONDARY BATTERY

CROSS REFERENCE TO RELATED APPLICATIONS

The present application is a continuation of PCT patent application no. PCT/JP2019/036788, filed on Sep. 19, 2019, which claims priority to Japanese patent application no. JP2018-175042 filed on Sep. 19, 2018, the entire contents of which are being incorporated herein by reference.

BACKGROUND

The present technology generally relates to a secondary battery.

In recent years, a technology for using a low melting point binder as a binder of an electrode is studied to improve battery characteristics.

SUMMARY

The present technology generally relates to a secondary battery.

The secondary batteries with conventional technology do not have sufficient heating safety, and therefore a secondary battery capable of obtaining good heating safety is desired.

An object of the present technology is to provide a secondary battery capable of obtaining good heating safety.

In order to achieve the object, a secondary battery is provided according to an embodiment of the present disclosure. The secondary battery includes a positive electrode, a negative electrode, and an electrolyte. the positive electrode includes a positive electrode active material layer that includes a positive electrode active material, a fluorine-based binder having a melting point from 152° C. to 166° C., a conductive assistant having a specific surface area from 1000 m$^2$/g to 1500 m$^2$/g, and a vinylpyrrolidone-based polymer.

According to the present technology, good heating safety can be obtained. It should be understood that the effects described here are not necessarily limited and may be any one of the effects described in the present invention or an effect different from them.

DETAILED DESCRIPTION

As described herein, the present disclosure will be described based on examples with reference to the drawings, but the present disclosure is not to be considered limited to the examples, and various numerical values and materials in the examples are considered by way of example.

Figure 1:
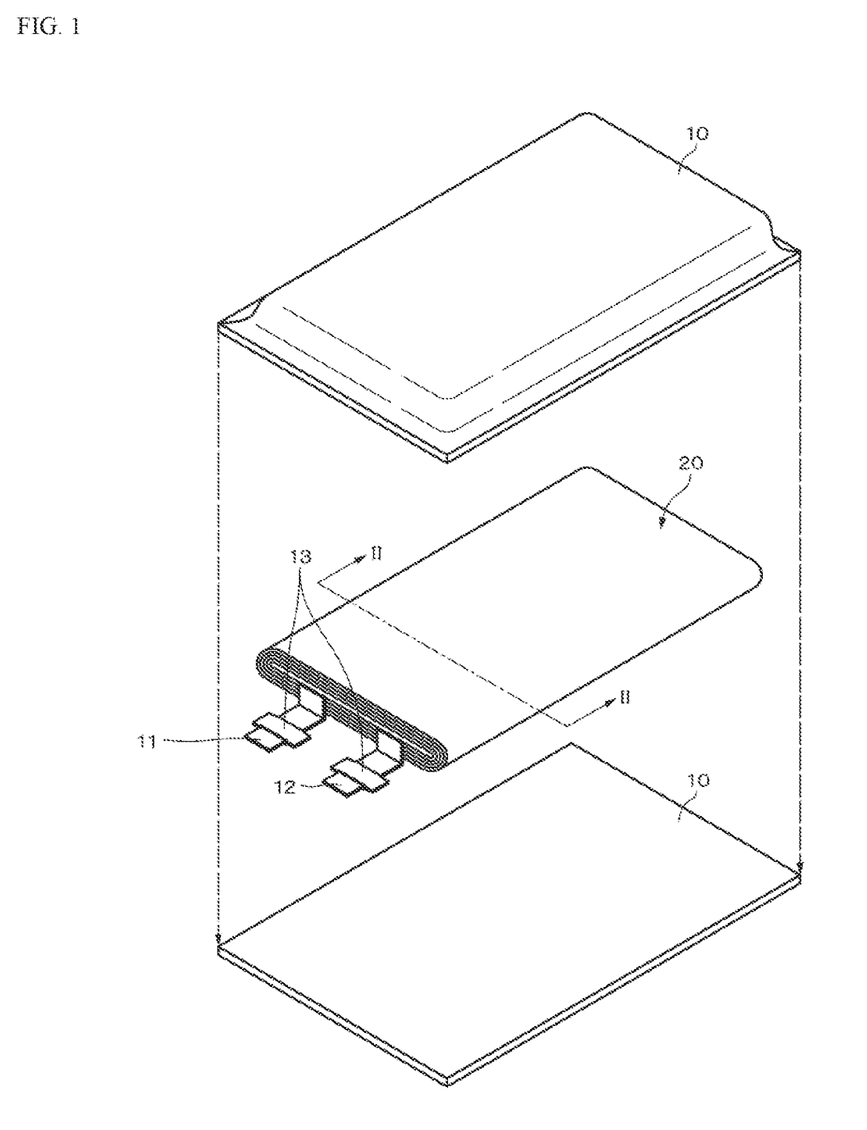
FIG. 1 is an exploded perspective view illustrating one example of the configuration of a non-aqueous electrolyte secondary battery according to an embodiment of the present technology.

FIG. 1 illustrates one example of the configuration of a non-aqueous electrolyte secondary battery (hereinafter, simply referred to as a "battery") according to the first embodiment of the present invention. The battery is a so-called laminate-type battery that is obtained by housing, in a film-shaped exterior member 10, an electrode body 20 having a positive electrode lead 11 and a negative electrode lead 12 attached thereto and that is capable of attaining the reduction in size, weight, and thickness.

Each of the positive electrode lead 11 and the negative electrode lead 12 goes from the inside toward the outside of the exterior member 10 and is, for example, led out toward an identical direction. Each of the positive electrode lead 11 and the negative electrode lead 12 is formed of, for example, a metal material such as Al, Cu, Ni, or stainless steel and is to be thin plate-shaped or net-shaped.

The exterior member 10 is formed of, for example, a rectangular aluminum laminate film obtained by bonding a nylon film, an aluminum foil, and a polyethylene film in this order. The exterior member 10 is provided, for example, such that the polyethylene film side thereof is opposite to the electrode body 20, and outer edges of the exterior member are attached firmly to each other by fusion bonding or with an adhesive. Between the exterior member 10 and each of the positive electrode lead 11 and the negative electrode lead 12, an adhesive film 13 for suppressing the intrusion of outside air is inserted. The adhesive film 13 is formed of a material having adhesiveness to the positive electrode lead 11 and the negative electrode lead 12, for example, a polyolefin resin such as polyethylene, polypropylene, modified polyethylene, or modified polypropylene.

The exterior member 10 may be formed of a laminate film having another structure, a polymer film such as polypropylene, or a metal film, in place of the aluminum laminate film. Alternatively, the exterior member may be formed of a laminate film that includes an aluminum film as a core material, and a polymer film stacked on one or both surfaces of the aluminum film.

Figure 2:
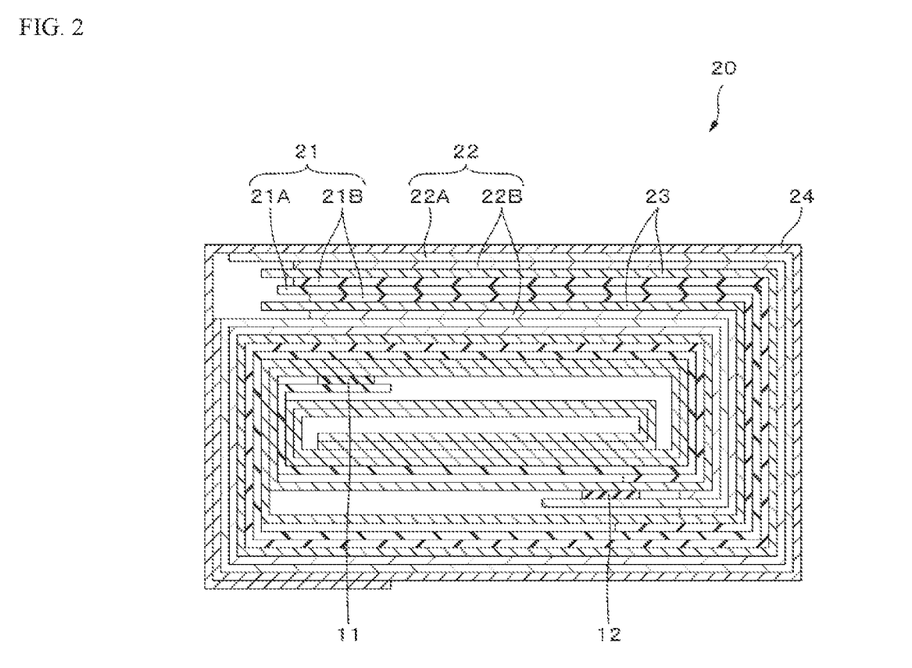
FIG. 2 is a sectional view taken along a line II-II in FIG. 1.

FIG. 2 is a sectional view taken along a line II-II of the electrode body 20 illustrated in FIG. 1. The electrode body 20 is a wound electrode body having a configuration obtained by stacking the long positive electrode 21 and the long negative electrode 22 with a long separator 23 interposed between the positive electrode and the negative electrode, and winding the stacked electrodes and separator in a flattened and swirling form, and an outermost peripheral portion of the electrode body is protected by a protection tape 24. Into the exterior member 10, an electrolytic solution as an electrolyte is injected for impregnation of the positive electrode 21, the negative electrode 22, and the separator 23.

Hereinafter, the positive electrode 21, the negative electrode 22, the separator 23, and the electrolytic solution that constitute the battery are sequentially described.

The positive electrode 21 includes, for example, a positive electrode current collector 21A and a positive electrode active material layer 21B provided on both surfaces of the positive electrode current collector 21A. The positive electrode current collector 21A is formed of, for example, a metal foil such as an aluminum foil, a nickel foil, or a stainless steel foil. The positive electrode current collector 21A may have a plate shape or a net shape. The positive electrode lead 11 may be formed by extending a part of a periphery of the positive electrode current collector 21A. The positive electrode active material layer 21B contains a positive electrode active material, a binder, a conductive assistant, and a dispersant.

The positive electrode active material contains positive electrode active material particles, and surfaces of the positive electrode active material particles are covered with a thin film containing the binder, the conductive assistant, and the dispersant. This thin film preferably covers the surfaces of the positive electrode active material particles so as to partially expose the surfaces of the positive electrode active material particles, from the viewpoint of securing a diffusion path of a Li ion and suppressing degradation of load characteristics.

As the positive electrode active material capable of occluding and releasing lithium, for example, a lithium-containing compound is appropriate, such as lithium oxide, lithium phosphorus oxide, lithium sulfide, or a lithium-containing intercalation compound, and two or more thereof may be used in mixture. In order to increase the energy density, a lithium-containing compound is preferable that contains lithium, a transition metal element, and oxygen. Examples of such a lithium-containing compound include a lithium composite oxide that is represented by Formula (A) and has a layered rock salt structure, and a lithium composite phosphate that is represented by Formula (B) and has an olivine-type structure. The lithium-containing compound more preferably contains, as the transition metal element, at least one of the group consisting of Co, Ni, Mn, and Fe. Examples of such a lithium-containing compound include a lithium composite oxide that is represented by Formula (C), (D), or (E) and has a layered rock salt structure, a lithium composite oxide that is represented by Formula (F) and has a spine-type structure, and a lithium composite phosphate that is represented by Formula (G) and has an olivine-type structure. Specific examples include $LiNi_{0.50}Co_{0.20}Mn_{0.30}O_2$, $LiCoO_2$, $LiNiO_2$, $LiNiaCo_{1-a}O_2$ (0<a<1), $LiMn_2O_4$, and $LiFePO_4$.

$$Li_pNi_{(1-q-r)}Mn_qM1_rO_{(2-y)}X_z \quad (A)$$

(In Formula (A), M1 represents at least one of elements selected from Groups 2 to 15 except Ni and Mn. X represents at least one of elements in Group 16 except oxygen and elements in Group 17. p, q, y, and z represent values in the ranges of $0 \le p \le 1.5$, $0 \le q \le 1.0$, $0 \le r \le 1.0$, $-0.10 \le y \le 0.20$, and $0 \le z \le 0.2$.)

$$Li_aM2_bPO_4 \quad (B)$$

(In Formula (B), M2 represents at least one of elements selected from Groups 2 to 15. a and b represent values in the ranges of $0 \le a \le 2.0$ and $0.5 \le b \le 2.0$.)

$$Li_jMn_{(1-g-h)}Ni_gM3_hO_{(2-j)}F_k \quad (C)$$

(In Formula (C), M3 represents at least one of the group consisting of Co, Mg, Al, B, Ti, V, Cr, Fe, Cu, Zn, Zr, Mo, Sn, Ca, Sr, and W. f, g, h, j, and k represent values in the ranges of $0.8 \le f \le 1.2$, $0 < g < 0.5$, $0 \le h \le 0.5$, $g+h<1$, $-0.1 \le j \le 0.2$, and $0 \le k \le 0.1$. The composition of lithium is different depending on the charge and discharge state of the battery and the value f represents a value when the battery is in full discharge.)

$$Li_mNi_{(1-n)}M4_nO_{(2-p)}F_q \quad (D)$$

(In Formula (D), M4 represents at least one of the group consisting of Co, Mn, Mg, Al, B, Ti, V, Cr, Fe, Cu, Zn, Mo, Sn, Ca, Sr, and W. m, n, p, and q represent values in the ranges of $0.8 \le m \le 1.2$, $0.005 \le n \le 0.5$, $-0.1 \le p \le 0.2$, and $0 \le q \le 0.1$. The composition of lithium is different depending on the charge and discharge state of the battery and the value m represents a value when the battery is in full discharge.)

$$Li_rCo_{(1-s)}M5_sO_{(2-t)}F_u \quad (E)$$

(In Formula (E), M5 represents at least one of the group consisting of Ni, Mn, Mg, Al, B, Ti, V, Cr, Fe, Cu, Zn, Mo, Sn, Ca, Sr, and W. r, s, t, and u represent values in the ranges of $0.8 \le r \le 1.2$, $0 \le s < 0.5$, $-0.1 \le t \le 0.2$, and $0 \le u \le 0.1$. The composition of lithium is different depending on the charge and discharge state of the battery and the value r represents a value when the battery is in full discharge.)

$$Li_vMn_{2-w}M6_wO_xF_y \quad (F)$$

(In Formula (F), M6 represents at least one of the group consisting of Co, Ni, Mg, Al, B, Ti, V, Cr, Fe, Cu, Zn, Mo, Sn, Ca, Sr, and W. v, w, x, and y represent values in the ranges of $0.9 \le v \le 1.1$, $0 \le w \le 0.6$, $3.7 \le x \le 4.1$, and $0 \le y \le 0.1$.

The composition of lithium is different depending on the charge and discharge state of the battery and the value v represents a value when the battery is in full discharge.)

$$Li_zM7PO_4 \quad (G)$$

(In Formula (G), M7 represents at least one of the group consisting of Co, Mg, Fe, Ni, Mg, Al, B, Ti, V, Nb, Cu, Zn, Mo, Ca, Sr, W, and Zr. z represents a value in the range of $0.9 \le z \le 1.1$. The composition of lithium is different depending on the charge and discharge state of the battery and the value z represents a value when the battery is in full discharge.)

In addition to these compounds, an inorganic compound containing no lithium, such as $MnO_2$, $V_2O_5$, $V_6O_{13}$, NiS, or MoS can also be used as the positive electrode active material capable of occluding and releasing lithium.

The positive electrode active material capable of occluding and releasing lithium may also be a compound other than those described above. The positive electrode active materials described above as examples may be mixed in any combination of two or more thereof.

The binder contains a fluorine-based binder having a melting point of 166° C. or lower. When the fluorine-based binder has a melting point of higher than 166° C., the binder is less likely to flow when the positive electrode active material layer 21B is dried (heat-treated) in a step of producing the positive electrode 21, and it becomes impossible to broadly cover the surfaces of the positive electrode active material particles with a thin binder film. Accordingly, it becomes impossible to obtain good heating safety. The lower limit value of the melting point of the fluorine-based binder is not particularly limited but is, for example, 152° C. or higher.

The melting point of the fluorine-based binder is measured as follows, for example.

First, the positive electrode 21 is taken out from the battery, washed with dimethyl carbonate (DMC), and dried. Then, the positive electrode current collector 21A is removed to obtain the positive electrode active material layer, which is heated and stirred in an appropriate dispersion medium (for example, N-methyl pyrrolidone) to disperse the positive electrode active material, the binder, the conductive assistant, and the dispersant in the dispersion medium. Thereafter, the positive electrode active material is removed by centrifugal separation, and the supernatant solution can be subjected to filtration and then to reprecipitation in water to take the binder out. A polyvinylpyrrolidone-based polymer used as the dispersant is dissolved in water, and therefore the reprecipitation in water enables only the fluorine-based binder to be taken out.

Figure 3:
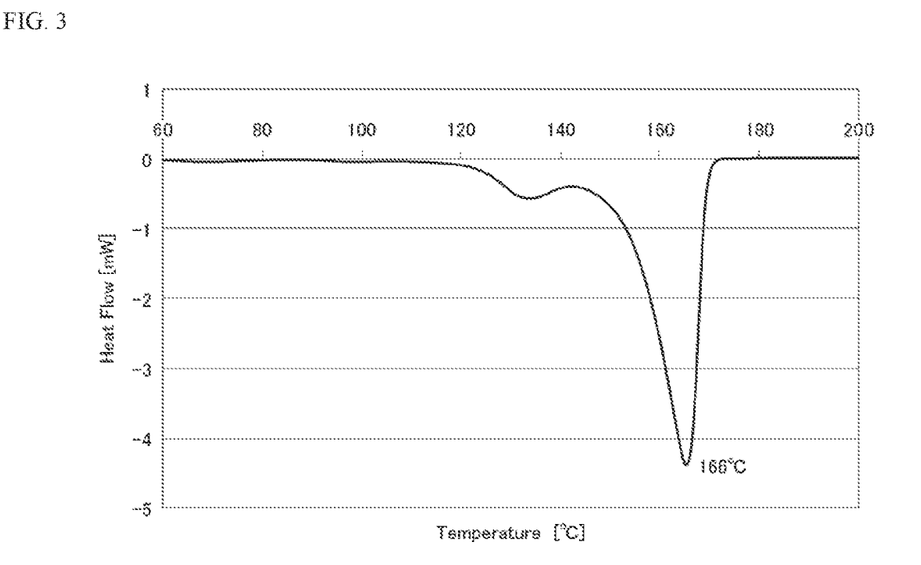
FIG. 3 is a graph illustrating one example of the DSC curve of a fluorine-based binder according to an embodiment of the present disclosure.

Next, several to several tens mg of the sample is heated at a temperature rise rate of 1 to 10° C./min by a differential scanning calorimeter (DSC, Rigaku Thermo plus DSC 8230 manufactured by Rigaku Corporation), and a temperature representing the maximum endothermic amount among endothermic peaks (see FIG. 3) appearing in the temperature range of 100° C. to 250° C. is defined as the melting point of the fluorine-based binder. In the present invention, the melting point is defined as a temperature at which the polymer represents flowability by heating or warming.

The fluorine-based binder is, for example, polyvinylidene difluoride (PVdF). As the polyvinylidene difluoride, a homopolymer of vinylidene difluoride (VdF) is preferably used. As the polyvinylidene difluoride, a copolymer of vinylidene difluoride (VdF) with another monomer can also be used, but polyvinylidene difluoride that is a copolymer is easily swollen by and dissolved in the electrolytic solution and has weak bonding force to possibly degrade the characteristics of the positive electrode 21. Polyvinylidene difluoride may also be used that has one part, e.g., an end thereof modified with a carboxylic acid such as maleic acid.

The content of the fluorine-based binder in the positive electrode active material layer 21B is 0.7 mass % or more and 4.0 mass % or less, preferably 2.0 mass % or more and 4.0 mass % or less, more preferably 3.0 mass % or more and 4.0 mass % or less. When the content of the fluorine-based binder is 0.7 mass % or more, the binder is capable of effectively covering the surfaces of the positive electrode active material particles, and particularly good heating safety can thus be obtained. On the other hand, when the content of the binder is 4.0 mass % or less, the exposure rate of the surfaces of the positive electrode active material particles can be lowered to decrease the diffusion path of a Li ion and thus suppress degradation of load characteristics. A rise in the internal resistance of the battery during charge and discharge cycles can also be suppressed to suppress degradation of cycle characteristics.

The content of the fluorine-based binder is measured as follows. First, the positive electrode 21 is taken out from the battery, washed with DMC, and dried. Next, several to several tens mg of the sample is heated to 600° C. in an air atmosphere at a temperature rise rate of 1 to 5° C./min by a thermogravimetry-differential thermal analyzer (TG-DTA, Rigaku Thermo plus TG8120 manufactured by Rigaku Corporation), and the content of the fluorine-based binder in the positive electrode active material layer 21B is obtained from the reduced weight during the heating. Whether or not the reduced weight is attributed to the fluorine-based binder can be confirmed by isolating the fluorine-based binder as described above in the method of measuring the melting point of the fluorine-based binder, performing the TG-DTA measurement only for the fluorine-based binder in an air atmosphere, and checking at what temperature the fluorine-based binder is burnt.

The conductive assistant preferably has a granular shape, a hollow shape, or a sheet shape. Among these shapes, a conductive assistant having a granular shape is particularly preferable. Two or more conductive assistants having these shapes may be used in combination, but the single use of a conductive assistant is particularly preferable. This is because the single use of granular particles more easily covers the surface of the active material. As the conductive assistant, for example, at least one of the group consisting of a carbon material, a metal material, a conductive polymer material, and the like can be used. As a carbon material having a granular shape, ketjen black is preferable. As a carbon material having a needle shape, a carbon nanotube is preferable. As the carbon nanotube, for example, at least one of multi-wall carbon nanotubes (MWCNT) such as a single-wall carbon nanotube (SWCNT) and a double-wall carbon nanotube (DWCNT) can be used. As a carbon material having a sheet shape, graphene is preferable.

Here, the "granular shape" means the shape of a conductive assistant particle having an aspect ratio of 1 or more and 4 or less. The aspect ratio is measured as follows. First, the battery is disassembled to take out the positive electrode 21, which is washed with DMC, dried, and then cut to collect a sample piece, and a sectional SEM (Scanning Electron Microscope) image of this sample piece is captured. Then, in the captured sectional SEM image, a circumscribed rectangle of a conductive assistant particle is set, and a length L1 of a long side and a length L2 of a short side of the rectangle are obtained. When a plurality of rectangles are set with respect to one conductive assistant particle, a rectangle having the minimum area is to be selected. Next, the ratio (L1/L2) between the length L1 of the long side and the length L2 of the short side that have been obtained is calculated and defined as the aspect ratio.

The specific surface area of the conductive assistant is 1000 $m^2/g$ or more and 1500 $m^2/g$ or less, preferably 1250 $m^2/g$ or more and 1500 $m^2/g$ or less, more preferably 1300 $m^2/g$ or more and 1500 $m^2/g$ or less, further more preferably 1350 $m^2/g$ or more and 1500 $m^2/g$ or less. When the specific surface area of the conductive assistant is less than 1000 $m^2/g$, the particle size of the conductive assistant particles is excessively large to make it difficult for the conductive assistant particles to thinly cover the surfaces of the positive electrode active material particles. Accordingly, it becomes impossible to obtain good heating safety. On the other hand, when the specific surface area of the conductive assistant is more than 1500 $m^2/g$, the conductive assistant particles are excessively small to be easily aggregated and thus have difficulty thinly covering the surfaces of the positive electrode active material particles. Accordingly, it becomes impossible to obtain good heating safety. Further, the coatability of a positive electrode mixture slurry is deteriorated in a step of producing the positive electrode 21.

The specific surface area of the conductive assistant is measured as follows. First, the positive electrode 21 is taken out from the battery, washed with DMC, and dried. Then, the positive electrode current collector 21A is removed to obtain the positive electrode active material layer, which is heated and stirred in an appropriate dispersion medium (for example, N-methyl pyrrolidone) to disperse or dissolve the positive electrode active material, the binder, the conductive assistant, and the dispersant in the dispersion medium. Then, only the positive electrode active material is removed by centrifugal separation. The residual supernatant solution is mixed with a solvent (for example, hexane) in which the binder and the dispersant are insoluble to allow reprecipitation of the binder and the dispersant, which are removed by centrifugal separation. Thereafter, the final residual solution is evaporated to dryness to take out only the conductive assistant, which is pretreated and then measured for the specific surface area by a gas adsorption method (BET method) on the basis of a method in conformity with JIS Z8830: 2013. As a measurement apparatus, an automatic specific surface area and pore distribution analyzer (TriStar3000 manufactured by SHIMADZU CORPORATION) is used. The pretreatment of the conductive assistant has been performed as follows. The taken-out conductive assistant is vacuum-dried at 200° C. for 3 hours and measured for the weight after the drying. Thereafter, the sample is introduced into the predetermined apparatus to measure the specific surface area from the amount of nitrogen adsorption.

The content of the conductive assistant in the positive electrode active material layer 21B is preferably 0.2 mass % or more and 5 mass % or less, more preferably 0.25 mass % or more and 3 mass % or less, further more preferably 0.3 mass % or more and 1.5 mass % or less. When the content of the conductive assistant is 0.2 mass % or more, the conductive assistant particles are capable of effectively covering the surfaces of the positive electrode active material particles, and particularly good heating safety can thus be obtained. Further, a good conductive path can be formed on the positive electrode active material layer 21B to reduce the internal resistance of the battery. On the other hand, when the content of the conductive assistant is 5 mass % or less, a decrease in battery capacitance can be suppressed.

The content of the conductive assistant is measured as follows. First, the positive electrode 21 is taken out from the battery, washed with DMC, and dried. Next, several to several tens mg of the sample is heated to 600° C. in an air atmosphere at a temperature rise rate of 1 to 5° C./min by a thermogravimetry-differential thermal analyzer (TG-DTA, Rigaku Thermo plus TG8120 manufactured by Rigaku Corporation). Then, the content of the conductive assistant is obtained by deducting, from the reduced weight during the heating, the reduced weight attributed to a burning reaction of the binder. Whether or not the reduced weight is attributed to the binder can be confirmed by isolating the binder as described above in the method of measuring the melting point of the binder, performing the TG-DTA measurement only for the binder in an air atmosphere, and checking at what temperature the binder is burnt.

The dispersant improves the dispersibility of the conductive assistant in a state of a positive electrode mixture slurry and suppresses aggregation of the conductive assistant. Therefore, the positive electrode active material layer 21B that contains the dispersant enables the conductive assistant to thinly cover the surfaces of the positive electrode active material particles. Further, the coatability of the positive electrode mixture slurry can also be improved. The dispersant may have a function as the binder.

As the dispersant, a vinylpyrrolidone-based polymer is used. Here, the "vinylpyrrolidone-based polymer" refers to a polymer containing, as a monomer, vinylpyrrolidone or a derivative thereof. The vinylpyrrolidone-based polymer includes, for example, at least one selected from the group consisting of a homopolymer of vinylpyrrolidone (polyvinylpyrrolidone: PVP), a homopolymer of a derivative of vinylpyrrolidone, a copolymer of vinylpyrrolidone and another monomer, and copolymer of a derivative of vinylpyrrolidone and another monomer. A vinylpyrrolidone-based polymer having one part, e.g., an end thereof modified may also be used.

The content of the dispersant in the positive electrode active material layer 21B is preferably 0.01 mass % or more and 0.2 mass % or less, more preferably 0.03 mass % or more and 0.15 mass % or less, further more preferably 0.05 mass % or more and 0.1 mass % or less. When the content of the dispersant is 0.01 mass % or more, the dispersibility of the conductive assistant can be effectively increased to enable the conductive assistant particles to effectively cover the surfaces of the positive electrode active material particles. Accordingly, particularly good heating safety can be obtained. On the other hand, when the content of the dispersant is 0.2 mass % or less, a decrease in battery capacitance can be suppressed.

Whether or not the polyvinylpyrrolidone-based polymer has been added into the positive electrode active material layer 21B and the content of the polyvinylpyrrolidone-based polymer can be analyzed by time-of-flight secondary ion mass spectrometry (TOF-SIMS).

The mass proportion of the dispersant in the total amount of the dispersant and the binder is preferably 0.2 mass % or more and 33.4 mass % or less, preferably 0.5 mass % or more and 15 mass % or less, more preferably 1 mass % or more and 8 mass % or less. When the content of the dispersant is 0.2 mass % or more, the dispersion of the fluorine-based binder can be effectively increased. On the other hand, when the content of the dispersant is 33.4 mass % or less, the density of the positive electrode 21 can be increased.

The mass ratio can be obtained using the contents of the binder and the dispersant measured as described above.

The negative electrode 22 includes, for example, a negative electrode current collector 22A and a negative electrode active material layer 22B provided on both surfaces of the negative electrode current collector 22A. The negative electrode current collector 22A is formed of, for example, a metal foil such as a copper foil, a nickel foil, or a stainless steel foil. The negative electrode current collector 22A may have a plate shape or a net shape. The negative electrode lead 12 may be formed by extending a part of a periphery of the negative electrode current collector 22A. The negative electrode active material layer 22B contains one or two or more negative electrode active materials capable of occluding and releasing lithium. The negative electrode active material layer 22B may further contain at least one of a binder or a conductive assistant as necessary.

This battery preferably includes the negative electrode 22 or the negative electrode active material having a larger electrochemical equivalent than the electrochemical equivalent of the positive electrode 21 to theoretically allow no deposition of lithium metal on the negative electrode 22 during the charge.

Examples of the negative electrode active material include carbon materials such as non-graphitizable carbon, graphitizable carbon, graphite, pyrolytic carbons, cokes, glassy carbons, an organic polymer compound fired body, a carbon fiber, and activated carbon. The cokes among these carbon materials include pitch coke, needle coke, petroleum coke, and the like. The organic polymer compound fired body refers to a product obtained by carbonizing a polymer material such as a phenol resin or a furan resin through firing at an appropriate temperature, and some of such products are classified into non-graphitizable carbon or graphitizable carbon. These carbon materials are preferable because they have much less change in the crystal structure caused during the charge and discharge to enable the battery to obtain a high charge and discharge capacitance and good cycle characteristics. Particularly, graphite is preferable because it has a large electrochemical equivalent to enable the battery to obtain a high energy density. Further, non-graphitizable carbon is preferable because it enables the battery to obtain excellent cycle characteristics.

Furthermore, a material that is low in charge and discharge potential, specifically a material that has a charge and discharge potential close to the charge and discharge potential of lithium metal is preferable because it enables the battery to easily attain a high energy density.

Examples of another negative electrode active material that enables the battery to have a high capacitance include a material containing at least one of a metal element or a metalloid element as a constituent element (for example, an alloy, a compound, or a mixture). This is because the use of such a material enables the battery to obtain a high energy density. Particularly, the use of such a material together with the carbon material is more preferable because it enables the battery to obtain a high energy density and excellent cycle characteristics. In the present invention, the alloy includes not only one formed of two or more metal elements but also one formed of one or more metal elements and one or more metalloid elements. Further, the alloy may also contain a non-metal element. The alloy includes, as its structure, a solid solution, a eutectic crystal (eutectic mixture), an intermetallic compound, or two or more thereof in coexistence.

Examples of such a negative electrode active material include a metal element or a metalloid element capable of forming an alloy with lithium. Specific examples include Mg, B, Al, Ti, Ga, In, Si, Ge, Sn, Pb, Bi, Cd, Ag, Zn, Hf, Zr, Y, Pd, and Pt. These elements may be crystalline or amorphous.

As the negative electrode active material, a material is preferable that contains, as a constituent element, a metal element in Group 4B of the short periodic table or a metalloid element, and a material is more preferable that contains at least one of Si or Sn as a constituent element. This is because Si and Sn are high in ability of occluding and releasing lithium to enable the battery to obtain a high energy density. Examples of such a negative electrode active material include a simple substance, an alloy, or a compound of Si, a simple substance, an alloy, or a compound of Sn, and a material that at least partially has one or two or more thereof.

Examples of the Si alloy include one containing, as a second constituent element other than Si, at least one selected from the group consisting of Sn, Ni, Cu, Fe, Co, Mn, Zn, In, Ag, Ti, Ge, Bi, Sb, Nb, Mo, Al, P, Ga, and Cr. Examples of the Sn alloy include one containing, as a second constituent element other than Sn, at least one selected from the group consisting of Si, Ni, Cu, Fe, Co, Mn, Zn, In, Ag, Ti, Ge, Bi, Sb, Nb, Mo, Al, P, Ga, and Cr.

Examples of the Sn compound or the Si compound include one containing O or C as a constituent element. These compounds may also contain the second constituent element described above.

Above all, the Sn-based negative electrode active material preferably contains Co, Sn, and C as constituent elements and has a low-crystallizability or amorphous structure.

Examples of another negative electrode active material include a metal oxide or a polymer compound capable of occluding and releasing lithium. Examples of the metal oxide include lithium titanium oxide containing Li and Ti, such as lithium titanate ($Li_4Ti_5O_{12}$); iron oxide; ruthenium oxide; and molybdenum oxide. Examples of the polymer compound include polyacetylene, polyaniline, and polypyrrole.

Used as the binder is, for example, at least one selected from the group consisting of resin materials such as polyvinylidene difluoride (PVdF), polytetrafluoroethylene (PTFE), polyacrylonitrile (PAN), a styrene butadiene rubber (SBR), and carboxymethyl cellulose (CMC), copolymers containing these resin materials as a main component, and the like.

Used as the conductive assistant is, for example, at least one carbon material selected from the group consisting of graphite, a carbon fiber, carbon black, ketjen black, a carbon nanotube, and the like. The conductive assistant, however, is not limited to the carbon material, and any material is acceptable as the conductive assistant as long as the material has conductivity. For example, a metal material, a conductive polymer material, or the like may be used as the conductive assistant.

The separator 23 separates the positive electrode 21 from the negative electrode 22 to prevent a current short circuit caused by contact between both the electrodes and lets a lithium ion pass therethrough. The separator 23 is formed of a porous film containing, for example, polytetrafluoroethylene, a polyolefin resin (polypropylene (PP), polyethylene (PE), or the like), an acrylic resin, a styrene resin, a polyester resin, a nylon resin, or a resin obtained by blending these resins. The separator may have a structure obtained by stacking porous films of two or more of these materials.

Above all, a polyolefin porous film is preferable because it has an excellent short circuit-prevention effect and is capable of improving the safety of the battery by its shutdown effect. Particularly, polyethylene is preferable as a material constituting the separator 23 because it is capable of giving a shutdown effect in the range of 100° C. or higher and 160° C. or lower and is excellent in electrochemical stability. Among types of polyethylene, low-density polyethylene, high-density polyethylene, and linear polyethylene are suitably used because they have an appropriate fusing temperature and are easily available. Besides these materials, it is possible to use a material obtained by copolymerizing or blending a chemically stable resin with polyethylene or polypropylene. Alternatively, the porous film may have a three or more layer structure obtained by sequentially stacking a polypropylene layer, a polyethylene layer, and a polypropylene layer. For example, the porous film is configured to have a three layer (PP/PE/PP) structure and desirably has a mass ratio [mass %] between PP and PE (PP:PE) of 60:40 to 75:25. Alternatively, the porous film can be formed as a single-layer substrate having 100 wt % of PP or 100 wt % of PE from the viewpoint of costs. As a method of producing the separator 23, either of a wet production method or a dry production method is employed.

As the separator 23, a nonwoven fabric may be used. As a fiber constituting the nonwoven fabric, it is possible to use an aramid fiber, a glass fiber, a polyolefin fiber, a polyethylene terephthalate (PET) fiber, a nylon fiber, or the like. Alternatively, two or more of these fibers may be mixed to form the nonwoven fabric.

The separator 23 may be configured to include a substrate and a surface layer provided on one or both surfaces of the substrate. The surface layer contains electrically insulating inorganic particles and a resin material that binds the inorganic particles to a surface of the substrate and binds the inorganic particles to each other. This resin material may be formed into, for example, fibrils and have a three-dimensional network structure formed through connection of a plurality of fibrils. The inorganic particles are supported by the resin material having this three-dimensional network structure. Alternatively, the resin material may bind the surface of the substrate and the inorganic particles to each other without being formed into fibrils. This case enables the resin material to obtain a higher binding property. The surface layer provided on one or both surfaces of the substrate as described above is capable of increasing the oxidation resistance, the heat resistance, and the mechanical strength of the separator 23.

The substrate is a porous film formed of an insulating film that lets a lithium ion pass therethrough and has prescribed mechanical strength, and pores of the substrate retain the electrolytic solution. Therefore, the substrate preferably has characteristics of high resistance to the electrolytic solution, low reactivity, and a tendency to be less expanded.

As the material constituting the substrate, the above-described resin materials and nonwoven fabrics constituting the separator 23 can be used.

The inorganic particles contain at least one selected from the group consisting of a metal oxide, a metal nitride, a metal carbide, a metal sulfide, and the like. As the metal oxide, it is possible to suitably use aluminum oxide (alumina, $Al_2O_3$), boehmite (hydrated aluminum oxide), magnesium oxide (magnesia, MgO), titanium oxide (titania, $TiO_2$), zirconium oxide (zirconia, $ZrO_2$), silicon oxide (silica, $SiO_2$), yttrium oxide (yttria, $Y_2O_3$), or the like. As the metal nitride, it is possible to suitably use silicon nitride ($Si_3N_4$), aluminum nitride (AlN), boron nitride (BN), titanium nitride (TiN), or the like. As the metal carbide, it is possible to suitably use silicon carbide (SiC), boron carbide ($B_4C$), or the like. As the metal sulfide, it is possible to suitably use barium sulfate ($BaSO_4$) or the like. Among the metal oxides described above, it is preferable to use alumina, titania (particularly, titania having a rutile-type structure), silica, or magnesia, and it is more preferable to use alumina.

Further, the inorganic particles may contain a mineral such as a porous aluminosilicate such as a zeolite ($M_{2/n}O \cdot Al_2O_3 \cdot xSiO_2 \cdot yH_2O$, M is a metal element, $x \geq 2$, $y \geq 0$); a layered silicate; barium titanate ($BaTiO_3$); or strontium titanate ($SrTiO_3$). The inorganic particles have the oxidation resistance and the heat resistance, and the inorganic particle-containing surface layer on the side opposite to the positive electrode also has strong resistance to an oxidizing environment near the positive electrode during the charge. The shape of the inorganic particles is not particularly limited, and it is possible to use any of spherical, plate, fibrous, cubic, and random shapes.

The inorganic particles preferably have a particle size in the range of 1 nm or more and 10 μm or less. This is because the inorganic particles having a particle size of less than 1 nm are not easily available, and the inorganic particles having a particle size of more than 10 m increase the interelectrode distance not to be able to sufficiently obtain an active-material filling amount in a limited space and thus to lower the battery capacitance.

Examples of the resin material constituting the surface layer include fluorine-containing resins such as polyvinylidene difluoride and polytetrafluoroethylene; fluorine-containing rubbers such as a vinylidene difluoride-tetrafluoroethylene copolymer and an ethylene-tetrafluoroethylene copolymer; rubbers such as a styrene-butadiene copolymer or a hydrogenated product thereof, an acrylonitrile-butadiene copolymer or a hydrogenated product thereof, an acrylonitrile-butadiene-styrene copolymer or a hydrogenated product thereof, a methacrylic acid ester-acrylic acid ester copolymer, a styrene-acrylic acid ester copolymer, an acrylonitrile-acrylic acid ester copolymer, an ethylene propylene rubber, polyvinyl alcohol, and polyvinyl acetate; cellulose derivatives such as ethyl cellulose, methyl cellulose, hydroxyethyl cellulose, and carboxymethyl cellulose; and resins having at least one of a melting point or a glass transition temperature of 180° C. or higher to have high heat resistance, such as polyphenylene ether, polysulfone, polyethersulfone, polyphenylene sulfide, polyether imide, polyimide, a polyamide, e.g., a wholly aromatic polyamide (aramid), polyamide imide, polyacrylonitrile, polyvinyl alcohol, polyether, an acrylic acid resin, and polyester. These resin materials may be used singly, or two or more thereof may be used in mixture. Above all, fluorine-based resins such as polyvinylidene difluoride are preferable from the viewpoints of the oxidation resistance and the flexibility, and the surface layer preferably contains aramid or polyamide imide from the viewpoint of the heat resistance.

As a method of forming the surface layer, it is possible to use, for example, a method of applying onto the substrate (porous film) a slurry containing a matrix resin, a solvent, and the inorganic particles, letting the substrate pass through a bath containing a poor solvent for the matrix resin and the above solvent as a good solvent for the matrix resin to cause phase separation, and thereafter drying the substrate.

The inorganic particles may be contained in the porous film as the substrate. The surface layer may be formed of only the resin material without containing the inorganic particles.

The electrolytic solution is a so-called non-aqueous electrolytic solution, and contains an organic solvent (non-aqueous solvent) and an electrolyte salt dissolved in this organic solvent. The electrolytic solution may contain a known additive to improve the battery characteristics. An electrolyte layer containing the electrolytic solution and a polymer compound to be a holding body that holds this electrolytic solution may also be used in place of the electrolytic solution. In this case, the electrolyte layer may be a gel.

As the organic solvent, it is possible to use a cyclic carbonic acid ester such as ethylene carbonate or propylene carbonate, and it is preferable to use one of ethylene carbonate or propylene carbonate, particularly preferable to use both ethylene carbonate and propylene carbonate in mixture. This is because such a solvent enables the battery to further improve the cycle characteristics.

As the organic solvent, it is preferable to use these cyclic carbonic acid esters by mixing with a chain carbonic acid ester such as diethyl carbonate, dimethyl carbonate, ethyl methyl carbonate, or methyl propyl carbonate. This is because such a solvent enables the electrolytic solution to have a high ionic conductivity.

As the organic solvent, it is preferable to use these mixtures by further mixing with a chain ester such as methyl acetate, ethyl acetate, ethyl propionate, or propyl propionate. This is because such a solvent enables the electrolytic solution to have a high ionic conductivity.

As the organic solvent, it is further preferable to also use 4-fluoro-1,3-dioxolan-2-one (FEC) or vinylene carbonate (VC). This is because 4-fluoro-1,3-dioxolan-2-one (FEC) is capable of further improving the discharge capacitance of the battery and vinylene carbonate is capable of further improving the cycle characteristics of the battery. Therefore, the mixture use of these compounds is preferable because it enables the battery to further improve the discharge capacitance and the cycle characteristics.

In addition to these compounds, acceptably used as the organic solvent are butylene carbonate, γ-butyrolactone, γ-valerolactone, 1,2-dimethoxyethane, tetrahydrofuran, 2-methyltetrahydrofuran, 1,3-dioxolane, 4-methyl-1,3-dioxolane, acetonitrile, glutaronitrile, adiponitrile, methoxyacetonitrile, 3-methoxypropylronitrile, N,N-dimethylformamide, N-methylpyrrolidinone, N-methyloxazolidinone, N,N-dimethylimidazolidinone, nitromethane, nitroethane, sulfolane, dimethylsulfoxide, and trimethyl phosphate.

Compounds obtained by at least partially substituting hydrogen of these organic solvents with fluorine are sometimes preferable because the compounds are sometimes capable of improving the reversibility of an electrode reaction depending on the types of electrodes in combination.

Examples of the electrolyte salt include a lithium salt, and one electrolyte salt may be used singly, or two or more electrolyte salts may be used in mixture. Examples of the lithium salt include $LiPF_6$, $LiBF_4$, $LiAsF_6$, $LiClO_4$, $LiB(C_6H_5)_4$, $LiCH_3SO_3$, $LiCF_3SO_3$, $LiN(SO_2CF_3)_2$, $LiC(SO_2CF_3)_3$, $LiAlCl_4$, $LiSiF_6$, LiCl, difluoro[oxolato-O,O'] lithium borate, lithium bis(oxalate)borate, and LiBr.

Above all, LiPF$_6$ is preferable because it enables the electrolytic solution to obtain a high ionic conductivity and enables the battery to further improve the cycle characteristics.

When the battery configured as described above is charged, a lithium ion is released from the positive electrode active material layer 21B and occluded by the negative electrode active material layer 22B through the electrolytic solution, for example. When the battery is discharged, a lithium ion is released from the negative electrode active material layer 22B and occluded by the positive electrode active material layer 21B through the electrolytic solution, for example.

Next described is one example of the method of manufacturing the battery according to the first embodiment of the present invention.

A positive electrode 21 is produced as follows. First, a positive electrode mixture is prepared by mixing, for example, a positive electrode active material, a binder, a conductive assistant, and a dispersant, and this positive electrode mixture is dispersed in a solvent such as N-methyl-2-pyrrolidone (NMP) to produce a pasty positive electrode mixture slurry. Next, this positive electrode mixture slurry is applied to a positive electrode current collector 21A, the solvent is dried, and the positive electrode current collector is subjected to compression molding with a roll pressing machine or the like to form a positive electrode active material layer 21B and thus give the positive electrode 21.

A negative electrode 22 is produced as follows. First, a negative electrode mixture is prepared by mixing, for example, a negative electrode active material with a binder, and this negative electrode mixture is dispersed in a solvent such as N-methyl-2-pyrrolidone to produce a pasty negative electrode mixture slurry. Next, this negative electrode mixture slurry is applied to a negative electrode current collector 22A, the solvent is dried, and the negative electrode current collector is subjected to compression molding with a roll pressing machine or the like to form a negative electrode active material layer 22B and thus give the negative electrode 22.

A wound electrode body 20 is produced as follows. First, a positive electrode lead 11 is attached to one end of the positive electrode current collector 21A by welding, and a negative electrode lead 12 is attached to one end of the negative electrode current collector 22A by welding. Next, the positive electrode 21 and the negative electrode 22 are wound around a flattened core with a separator 23 interposed between the positive electrode and the negative electrode and longitudinally wound many times to form a wound body, and then a protection tape 24 is attached to an outermost peripheral portion of the wound body to give the electrode body 20.

The electrode body 20 is sealed with an exterior member 10 as follows. First, the electrode body 20 is held in the exterior member 10, and the outer edges except one side of the exterior member are thermally fusion-bonded to form a bag, thus allowing the electrode body to be housed in the exterior member 10. In sealing, an adhesive film 13 is inserted between each of the positive electrode lead 11 and the negative electrode lead 12, and the exterior member 10. The adhesive film 13 may be attached to each of the positive electrode lead 11 and the negative electrode lead 12 in advance. Next, an electrolytic solution is injected into the exterior member 10 from the side having not been fusion-bonded, and the side having not been fusion-bonded is then thermally fusion-bonded in a vacuum atmosphere for hermetical sealing. The procedures described above give the battery illustrated in FIGS. 1 and 2.

A battery according to the first embodiment includes a positive electrode 21, a negative electrode 22, and an electrolytic solution. The positive electrode 21 includes a positive electrode active material layer 21B that contains a positive electrode active material, a low melting point fluorine-based binder having a melting point of 152° C. or higher and 166° C. or lower, a conductive assistant having a specific surface area of 1000 m$^2$/g or more and 1500 m$^2$/g or less, and a vinylpyrrolidone-based polymer (dispersant). This configuration enables both the conductive assistant and the fluorine-based binder to thinly cover a wide range of surfaces of positive electrode active material particles in a step of producing the positive electrode 21 and thus exposed surfaces of the positive electrode active material particles to be reduced. Accordingly, the reactivity between the positive electrode active material particles and the electrolytic solution can be lowered to suppress a self-heating reaction. Therefore, good heating safety can be obtained.

Single use of the fluorine-based binder, the conductive assistant, or the vinylpyrrolidone-based polymer can also improve the heating safety, but the combination of these materials can give an effect (synergy effect) exceeding the total of the effects exhibited when these materials are each used singly. It is presumed that such an effect can be obtained because the combination of the fluorine-based binder, the conductive assistant, and the vinylpyrrolidone-based polymer enables a good thin film containing the fluorine-based binder, the conductive assistant, and the vinylpyrrolidone-based polymer to cover a wide range of the surfaces of the positive electrode active material particles.

When the positive electrode active material contains a lithium transition metal oxide having a layered rock salt structure, thinly covering a wide range of the surfaces of the positive electrode active material particles with both the conductive assistant and the fluorine-based binder as described above can also suppress destruction of a crystal structure of the lithium transition metal oxide that is accompanied by oxygen release.

In the second embodiment, an electronic device including the battery according to the first embodiment is described.

Figure 4:
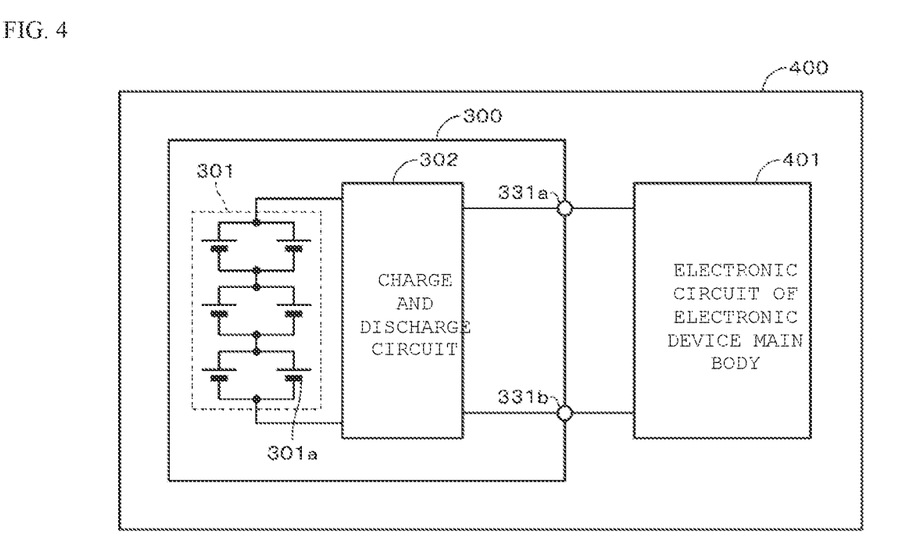
FIG. 4 is a block diagram illustrating one example of the configuration of an electronic device according to an embodiment of the present invention.

FIG. 4 illustrates one example of the configuration of an electronic device 400 according to the second embodiment of the present invention. The electronic device 400 includes an electronic circuit 401 of an electronic device main body, and a battery pack 300. The battery pack 300 is electrically connected to the electronic circuit 401 via a positive electrode terminal 331a and a negative electrode terminal 331b. The electronic device 400 may be configured to allow the battery pack 300 to be freely detached.

Examples of the electronic device 400 include but are not limited to: a notebook personal computer, a tablet computer, a mobile phone (for example, a smartphone), a handheld terminal (Personal Digital Assistants: PDA), a display device (an LCD (Liquid Crystal Display), an EL (Electro Luminescence) display, electronic paper, and the like), an imaging device (for example, a digital still camera and a digital video camera), an audio instrument (for example, a portable audio player), a game machine, a cordless phone handset, an electronic book, an electronic dictionary, a radio, a headphone, a navigation system, a memory card, a pacemaker, a hearing aid, an electric tool, an electric shaver, a refrigerator, an air conditioner, a television, a stereo, a water heater, a microwave oven, a dishwasher, a washing machine, a drier, a lighting device, a toy, a medical device, a robot, a road conditioner, and a traffic light.

The electronic circuit 401 includes, for example, a CPU (Central Processing Unit), a peripheral logic unit, an interface unit, and a storage unit, and controls the overall electronic device 400.

The battery pack 300 includes an assembled battery 301 and a charge and discharge circuit 302. The battery pack 300 may further include an exterior member (not shown) housing the assembled battery 301 and the charge and discharge circuit 302 as necessary.

The assembled battery 301 is configured to have a plurality of secondary batteries 301a connected in series and/or in parallel. The plurality of secondary batteries 301a are connected to form, for example, an arrangement of n batteries in parallel and m batteries in series (n and m are positive integers). FIG. 4 illustrates an example of the connection of six secondary batteries 301a in an arrangement of two batteries in parallel and three batteries in series (2P3S). As the secondary batteries 301a, the battery according to the first embodiment is used.

Here, the battery pack 300 is described that includes the assembled battery 301 formed of the plurality of secondary batteries 301a. The battery pack 300, however, may employ a configuration including one secondary battery 301a in place of the assembled battery 301.

The charge and discharge circuit 302 is a control unit that controls the charge and discharge of the assembled battery 301. Specifically, the charge and discharge circuit 302 controls the charge of the assembled battery 301 during the charge. On the other hand, the charge and discharge circuit 302 controls the discharge of the assembled battery for the electronic device 400 during the discharge (that is, during the use of the electronic device 400).

As the exterior member, for example, a case formed of a metal, a polymer resin, a composite material thereof, or the like can be used. Examples of the composite material include a stacked body obtained by stacking a metal layer and a polymer resin layer.

EXAMPLES

Hereinafter, the present invention is specifically described by way of examples, but is not limited to only these examples.

The melting point of polyvinylidene difluoride (fluorine-based binder) in the following examples and comparative examples is obtained by the measurement method described in the first embodiment.

Examples 1 to 3

A positive electrode was produced as follows. A positive electrode mixture was obtained by mixing 97.9 parts by mass of lithium cobaltite ($LiCO_2$) as the positive electrode active material, 1 part by mass of polyvinylidene difluoride (homopolymer of vinylidene difluoride) serving as the binder and having a melting point of 152° C., 1 part by mass of ketjen black (granular carbon material) as the conductive assistant, and 0.1 parts by weight of polyvinylpyrrolidone as the dispersant. Then, this positive electrode mixture was dispersed in an organic solvent (N-methyl-2-pyrrolidone: NMP) to give a pasty positive electrode mixture slurry. As shown in Table 1, ketjen black having a specific surface area of 1000 $m^2$/g, 1250 $m^2$/g, or 1500 $m^2$/g was used. Subsequently, the positive electrode mixture slurry was applied to a positive electrode current collector (aluminum foil) with a coater and dried to form a positive electrode active material layer. Finally, the positive electrode active material layer was compression-molded by a pressing machine.

A negative electrode was produced as follows. First, a negative electrode mixture was obtained by mixing 96 mass % of an artificial graphite powder as the negative electrode active material and 4 mass % of polyvinylidene difluoride (PVdF) as the binder. Then, this negative electrode mixture was dispersed in an organic solvent (N-methyl-2-pyrrolidone: NMP) to give a pasty negative electrode mixture slurry. Subsequently, the negative electrode mixture slurry was applied to a negative electrode current collector (copper foil) with a coater and dried. Finally, the negative electrode active material layer was compression-molded by a pressing machine.

An electrolytic solution was prepared as follows. First, a mixed solvent was prepared by mixing ethylene carbonate (EC), propylene carbonate (PC), and diethyl carbonate (DEC) at a mass ratio (EC:PC:DEC) of 15:15:70. Subsequently, lithium hexafluorophosphate ($LiPF_6$) as an electrolyte salt was dissolved in this mixed solvent to give a concentration of 1 mol/l and thus prepare the electrolytic solution.

A laminate-type battery was produced as follows. First, an aluminum positive electrode lead was welded to the positive electrode current collector, and a copper negative electrode lead was welded to the negative electrode current collector. Subsequently, the positive electrode and the negative electrode were attached firmly to each other, with a fine porous polyethylene film interposed between the positive electrode and the negative electrode, and then longitudinally wound to form a wound body, and then a protection tape was attached to an outermost peripheral portion of the wound body to produce a flattened wound electrode body. Next, this wound electrode body was loaded in an exterior member whose three sides were thermally fusion-bonded but whose one side was not thermally fusion-bonded to allow the exterior member to have an opening. As the exterior member, a moisture-proof aluminum laminate film was used that was obtained by stacking a 25-μm-thick nylon film, a 40-μm-thick aluminum foil, a 30-μm-thick polypropylene film in this order from the outermost layer.

Thereafter, an electrolytic solution was injected from the opening of the exterior member, whose one remaining side was thermally fusion-bonded under reduced pressure, and the wound electrode body was hermetically sealed. These procedures gave an objective laminate-type battery.

Examples 4 to 6

A battery was obtained in the same manner as in Examples 1 to 3 except that as shown in Table 1, polyvinylidene difluoride (homopolymer of vinylidene difluoride) having a melting point of 160° C. was used as the binder in the step of producing a positive electrode.

Examples 7 to 9

A battery was obtained in the same manner as in Examples 1 to 3 except that as shown in Table 1, polyvinylidene difluoride (homopolymer of vinylidene difluoride) having a melting point of 166° C. was used as the binder in the step of producing a positive electrode.

Examples 10 and 11

A battery was obtained in the same manner as in Example 7 except that as shown in Table 1, a carbon nanotube (needle-shaped carbon material) having a specific surface area of 1300 m²/g and graphene (sheet-shaped carbon material) having a specific surface property of 1200 m²/g were respectively used as the conductive assistant in the step of producing a positive electrode.

Comparative Examples 1 to 3

A battery was obtained in the same manner as in Examples 7, 5, and 3 except that as shown in Table 2, polyvinylpyrrolidone was not added as the dispersant in the step of producing a positive electrode.

Comparative Examples 4 to 6

A battery was obtained in the same manner as in Examples 7, 5, and 3 except that as shown in Table 2, ketjen black (granular carbon material) having a specific surface area of 600 m²/g was used as the conductive assistant in the step of producing a positive electrode.

Comparative Examples 7 to 9

A battery was obtained in the same manner as in Examples 1 to 3 except that as shown in Table 2, polyvinylidene difluoride (homopolymer of vinylidene difluoride) having a melting point of 175° C. was used as the binder in the step of producing a positive electrode.

Comparative Examples 10 to 12

A battery was obtained in the same manner as in Comparative Examples 4 to 6 except that as shown in Table 2, polyvinylpyrrolidone was not added as the dispersant in the step of producing a positive electrode.

Comparative Example 13 to 15

A battery was obtained in the same manner as in Comparative Examples 7 to 9 except that as shown in Table 2, polyvinylpyrrolidone was not added as the dispersant in the step of producing a positive electrode.

Comparative Example 16

A battery was obtained in the same manner as in Comparative Examples 4 except that as shown in Table 2, polyvinylidene difluoride (homopolymer of vinylidene difluoride) having a melting point of 175° C. was used as the binder in the step of producing a positive electrode.

Comparative Example 17

A battery was obtained in the same manner as in Comparative Example 16 except that as shown in Table 2, polyvinylpyrrolidone was not added as the dispersant in the step of producing a positive electrode.

Comparative Examples 18 and 19

A battery was obtained in the same manner as in Comparative Example 13 except that as shown in Table 2, a carbon nanotube (needle-shaped carbon material) having a specific surface property of 400 m²/g and graphene (sheet-shaped carbon material) having a specific surface area of 550 m²/g were respectively used as the conductive assistant in the step of producing a positive electrode.

The battery sample charged with CCCV (Constant Current/Constant Voltage) at 0.5 C and 4.5 V for 4 h was put in an oven and heated at a specified temperature. After the sample reached the specified temperature, the temperature of the constant-temperature oven was retained for 1 hour, and whether or not the battery generated thermal runaway was confirmed. This procedure was repeated until the thermal runaway was confirmed, while the specified temperature was raised. The upper limit temperature at which the thermal runaway was not confirmed was defined as a heating upper limit temperature.

Table 1 shows the configurations and the evaluation results of the positive electrodes of the batteries according to Examples 1 to 11.

TABLE 1

| | Melting point of binder [° C.] | Specific surface area of conductive assistant [m²/g] | Shape of conductive assistant | Addition of PVP | Upper limit temperature of heating [° C.] |
|---|---|---|---|---|---|
| Example 1 | 152 | 1000 | Granular shape | Added | 169 |
| Example 2 | 152 | 1250 | Granular shape | Added | 176 |
| Example 3 | 152 | 1500 | Granular shape | Added | 183 |
| Example 4 | 160 | 1000 | Granular shape | Added | 165 |
| Example 5 | 160 | 1250 | Granular shape | Added | 173 |
| Example 6 | 160 | 1500 | Granular shape | Added | 178 |
| Example 7 | 166 | 1000 | Granular shape | Added | 160 |
| Example 8 | 166 | 1250 | Granular shape | Added | 164 |
| Example 9 | 166 | 1500 | Granular shape | Added | 168 |
| Example 10 | 166 | 1300 | Needle shape | Added | 160 |
| Example 11 | 166 | 1200 | Sheet shape | Added | 162 |

Table 2 shows the configurations and the evaluation results of the positive electrodes of the batteries according to Comparative Examples 1 to 19.

TABLE 2

| | Melting point of binder [° C.] | Specific surface area of conductive assistant [m²/g] | Shape of conductive assistant | Addition of PVP | Upper limit temperature of heating [° C.] |
|---|---|---|---|---|---|
| Comparative Example 1 | 166 | 1000 | Granular shape | None | 145 |
| Comparative Example 2 | 160 | 1250 | Granular shape | None | 147 |
| Comparative Example 3 | 152 | 1500 | Granular shape | None | 145 |
| Comparative Example 4 | 166 | 600 | Granular shape | Added | 143 |
| Comparative Example 5 | 160 | 600 | Granular shape | Added | 146 |
| Comparative Example 6 | 152 | 600 | Granular shape | Added | 147 |
| Comparative Example 7 | 175 | 1000 | Granular shape | Added | 145 |
| Comparative Example 8 | 175 | 1250 | Granular shape | Added | 148 |
| Comparative Example 9 | 175 | 1500 | Granular shape | Added | 149 |
| Comparative Example 10 | 166 | 600 | Granular shape | None | 135 |
| Comparative Example 11 | 160 | 600 | Granular shape | None | 137 |
| Comparative Example 12 | 152 | 600 | Granular shape | None | 140 |

TABLE 2-continued

| | Melting point of binder [° C.] | Specific surface area of conductive assistant [m²/g] | Shape of conductive assistant | Addition of PVP | Upper limit temperature of heating [° C.] |
|---|---|---|---|---|---|
| Comparative Example 13 | 175 | 1000 | Granular shape | None | 135 |
| Comparative Example 14 | 175 | 1250 | Granular shape | None | 133 |
| Comparative Example 15 | 175 | 1500 | Granular shape | None | 136 |
| Comparative Example 16 | 175 | 600 | Granular shape | Added | 137 |
| Comparative Example 17 | 175 | 600 | Granular shape | None | 135 |
| Comparative Example 18 | 175 | 400 | Needle shape | None | 132 |
| Comparative Example 19 | 175 | 550 | Sheet shape | None | 134 |

The evaluation results of Examples 1 to 11 and Comparative Examples 1 to 19 clarify that good heating safety can be obtained by the positive electrode active material layer that contains a positive electrode active material, a fluorine-based binder having a melting point of 152° C. or higher and 166° C. or lower, a conductive assistant having a specific surface area of 1000 m²/g or more and 1500 m²/g or less, and polyvinylpyrrolidone (dispersant).

The evaluation results of Examples 1, 4, and 7, Examples 2, 5, and 8, and Examples 3, 6, and 9 clarify that the fluorine-based binder preferably has a melting point of 152° C. or higher and 160° C. or lower, from the viewpoint of improving the heating safety.

The evaluation results of Examples 1 to 3, Examples 4 to 6, and Examples 7 to 9 clarify that the conductive assistant preferably has a specific surface area of 1250 m²/g or more and 1500 m²/g or less, from the viewpoint of improving the heating safety.

The evaluation results of Examples 8, 10, and 11 clarify that the shape of the conductive assistant is preferably the granular shape among the granular shape, the needle shape, and the sheet shape, from the viewpoint of improving the heating safety.

In the foregoing, the embodiments of the present invention have been specifically described. The present invention, however, is not limited to the embodiments, and it is possible to implement various modifications based on a technical idea of the present technology.

For example, the configurations, the methods, the steps, the shapes, the materials, the values, and the like described in the embodiments are no more than examples, and a configuration, a method, a step, a shape, a material, a value, and the like may be employed that are different from these examples, as necessary.

Further, it is possible to combine the configurations, the methods, the steps, the shapes, the materials, the values, and the like in the embodiments, without departing from the spirit of the present technology.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A secondary battery comprising:
   a positive electrode including a positive electrode active material layer;
   a negative electrode; and
   an electrolyte,
   wherein the positive electrode active material layer includes a positive electrode active material, a homopolymer of polyvinylidene difluoride having a melting point from 152° C. to 166° C., a conductive assistant having a specific surface area from 1000 m²/g to 1500 m²/g, and a vinylpyrrolidone-based polymer,
   a content of the homopolymer of the polyvinylidene difluoride in the positive electrode active material layer is 0.7 mass % or more and 4.0 mass % or less,
   a content of the conductive assistant in the positive electrode active material layer is 0.2 mass % or more and 5 mass % or less, and
   a content of the vinylpyrrolidone-based polymer in the positive electrode active material layer is from 0.01 mass % to 0.2 mass %.

2. The secondary battery according to claim 1, wherein the conductive assistant has a granular shape.

3. The secondary battery according to claim 1, wherein the positive electrode active material includes a lithium transition metal oxide having a layered rock salt structure.

4. The secondary battery according to claim 1 further comprising a separator, wherein the separator is provided between the positive electrode and the negative electrode.

5. The secondary battery according to claim 4, wherein the separator includes a porous film.

6. The secondary battery according to claim 1, wherein the positive electrode further includes a positive electrode current collector.

7. The secondary battery according to claim 6, wherein the positive electrode current collector includes at least one of aluminum foil, nickel foil and a stainless steel foil.

8. An electronic device comprising:
   a secondary battery according to claim 1, and
   an electronic circuit that is electrically connected to the secondary battery.

9. The secondary battery according to claim 1, wherein the homopolymer of polyvinylidene difluoride has the melting point from 152° C. to 160° C., and wherein the conductive assistant has the specific surface area from 1250 m²/g to 1500 m²/g.

10. The secondary battery according to claim 9, wherein the conductive assistant includes a carbon material having a granular shape.

* * * * *